(12) United States Patent
Umakoshi

(10) Patent No.: US 8,387,906 B2
(45) Date of Patent: Mar. 5, 2013

(54) ENGAGING MEMBER SUPPORTING STRUCTURE AND WEBBING TAKE-UP DEVICE

(75) Inventor: Tomonari Umakoshi, Aichi-ken (JP)

(73) Assignee: Kabushiki Kaisha Tokai-Rika-Denki-Seisakusho, Niwa-Gun, Aichi-Ken (JP)

( * ) Notice: Subject to any disclaimer, the term of this patent is extended or adjusted under 35 U.S.C. 154(b) by 141 days.

(21) Appl. No.: 12/948,716

(22) Filed: Nov. 17, 2010

(65) Prior Publication Data

US 2011/0121122 A1 May 26, 2011

(30) Foreign Application Priority Data

Nov. 24, 2009 (JP) ................................. 2009-266662

(51) Int. Cl.
*B65H 75/48* (2006.01)
(52) U.S. Cl. ........................................ 242/376; 242/382
(58) Field of Classification Search .................. 242/374, 242/376, 379.1, 379.2, 382, 382.2
See application file for complete search history.

(56) References Cited

U.S. PATENT DOCUMENTS

| | | | | |
|---|---|---|---|---|
| 6,889,931 B2 * | 5/2005 | Mori et al. | ................. | 242/390.9 |
| 7,083,136 B2 * | 8/2006 | Mori et al. | ................. | 242/390.8 |
| 7,108,284 B2 * | 9/2006 | Mori et al. | .................... | 280/806 |
| 7,484,683 B2 * | 2/2009 | Mori et al. | .................... | 242/374 |
| 8,070,086 B2 * | 12/2011 | Umakoshi et al. | ............ | 242/374 |

FOREIGN PATENT DOCUMENTS

JP 2004-42788 A 2/2004

* cited by examiner

*Primary Examiner* — Sang Kim
(74) *Attorney, Agent, or Firm* — Roberts Mlotkowski Safran & Cole P.C.

(57) ABSTRACT

An engaging member supporting structure having a rotating body being connected to a spool, transmitting rotation to the spool and having rotation from the spool transmitted thereto; a support body provided coaxially with the rotating body; an engaging member provided at the support body and rotating in one direction to engage with the rotating body; a shaft potion formed at one of the support body or the engaging member; and a bearing portion formed at the other of the support body or the engaging member in such a manner that the shaft portion is inserted therein, whereby the engaging member is rotatably provided at the support body, wherein, in a state in which the engaging member engages with the rotating body, a clearance is formed between an outer peripheral surface of the shaft portion and a portion of an inner peripheral surface of the bearing portion.

9 Claims, 4 Drawing Sheets

TAKE-UP DIRECTION ing body or the engaging member; and a bearing portion formed in the other of the support body or the engaging body in such a manner that the support shaft is inserted therein, whereby the engaging member is rotatably provided at the support body, wherein in a state in which the engaging member engages with the rotating body, a clearance is formed between an outer peripheral surface of the support shaft and a portion of an inner peripheral surface of the bearing portion.

ENGAGING MEMBER SUPPORTING STRUCTURE AND WEBBING TAKE-UP DEVICE

CROSS-REFERENCE TO RELATED APPLICATION

This application claims priority under 35 USC 119 from Japanese Patent Application No. 2009-266662 filed Nov. 24, 2009, the disclosure of which is incorporated by reference herein.

BACKGROUND OF THE INVENTION

1. Technical Field

The present invention relates to an engaging member supporting structure for supporting an engaging member such as a pawl in, for example, a clutch, and also relates to a webbing take-up device in which a spool can be rotated in such a manner that driving force of a driving member is transmitted to the spool via the clutch.

2. Related Art

In a webbing take-up device disclosed in Japanese Patent Application Laid-Open (JP-A) No. 2004-42788, a clutch is interposed between a motor and a spool, and when a base plate of the clutch is rotated in a take-up direction by driving force of the motor, a pawl provided in the base plate rotates and engages with a rotary disk. In the above-described state, when the pawl rotates in the take-up direction together with the base plate, the rotary disk is pressed by the pawl to rotate in the take-up direction, and the pawl meshes with an external tooth of an adapter. The pawl is connected to the spool in a state of being not rotatable relative to the spool, and therefore, if the pawl rotates in the take-up direction together with the base plate in the above-described state, the adapter pressed by the pawl rotates in the take-up direction and the spool also rotates in the take-up direction. As a result, a webbing belt is taken up around the spool from its longitudinal direction base end side.

When the pawl which rotates in the take-up direction together with the base plate meshes with the stationary adapter, a reaction force corresponding to a pressing force from the pawl pressing the adapter acts on the pawl. For this reason, a boss which is provided in a base portion of the base plate so as to support the pawl in a rotatable manner is made sufficiently thick such that the boss has a enough strength sustainable to the above-described reaction force. However, making the boss thick increases friction between an outer peripheral portion of the boss and an inner peripheral portion of a circular hole formed in the pawl, and a loss caused when the pawl rotates around the boss becomes large.

In view of the above-described circumstances, the present invention provides an engaging member supporting structure and a webbing take-up device, which can reduce an impact imparted from a rotating body to an engaging member such as a pawl, and also which can lessen a rotational loss of the engaging member caused by resistance between an outer peripheral portion of a shaft portion and an inner peripheral portion of a bearing portion.

SUMMARY OF THE INVENTION

A first aspect of the present invention is an engaging member supporting structure comprising a rotating body that is connected to a spool and transmits rotation to the spool and have rotation from the spool transmitted thereto; a support body provided coaxially with the rotation body; an engaging member provided at the support body and rotating in one direction to engage with the rotating body; a support shaft formed in one of the support body or the engaging member; and a bearing portion formed in the other of the support body According to the engaging member support structure of the first aspect, the engaging member is supported at the support body in a rotatably manner. When the engaging member rotates in a direction of engagement, which is one rotating direction of the support body, the engaging member engages with the rotating body. As a result, displacement of the support body is transmitted to the rotating body via the engaging member, so that the rotating body rotates or rotation of the rotating body is regulated.

In the structure in which displacement of the support body is transmitted to the rotating body by engagement of the engaging member with the rotating body, or rotation of the rotating body is regulated, a pressing force or a pressing reaction force is imparted from the rotating body to the engaging member.

In the state in which the engaging member and the rotating body engage with each other, a clearance is formed between a surface of the inner peripheral surface of the bearing portion, which portion is close to the position at which the engaging member and the rotating body engage with each other, and the outer peripheral surface of the support shaft. For this reason, all or a large part of the above-described pressing force or pressing reaction force is not transmitted to the support shaft which supports the engaging member. Therefore, mechanical strength which resists force transmitted from the rotating body to the engaging member may not be given to the support shaft.

In the above first aspect, when the engaging member engages with the rotating body, the clearance may be formed between a portion of the outer peripheral surface of the support shaft that faces a direction of a force applied to the engaging member from the rotating body and the inner peripheral surface of the bearing portion.

A second aspect of the present invention is a webbing take-up device comprising: a spool to which one end in a longitudinal direction of an elongated band-shaped webbing belt is locked and the spool rotates in a take-up direction thereby taking up the webbing belt and accommodating the webbing belt on the spool; a driving member that rotates an output shaft by a driving force; a first rotating body connected to the output shaft and rotating by rotation of the output shaft being transmitted thereto; a second rotating body connected to the spool and rotating by rotation of the first rotating body being transmitted thereto, the second rotating body transmitting rotation of the first rotating body to the spool to rotate the spool; an engaging member supported at a supporting position apart from the rotation center outwardly in a radial direction of the first rotating body, rotating around the rotation center of the first rotating body together with the first rotating body, the engaging member swinging around the supporting position in a predetermined direction of engagement so as to engage with the second rotating body and transmitting rotation of the first rotating body in another predetermined direction to the second rotating body so as to rotate the second rotating body; a support shaft formed at one of the first rotating body or the engaging member; and a bearing portion formed at the other one of the first rotating body or the engaging body in such a manner that the support shaft is insertable therein, wherein when the support shaft is inserted in the bearing portion, the engaging member is supported rotatably at the supporting position, and in a state in which the engaging member engages with the second rotating body, a clearance is formed between the support shaft and an inner peripheral surface of the bearing portion close to a position at which the engaging member and the second rotating member engage with each other.

According to the webbing take-up device of the second aspect, when driving force is output from the driving member to rotate the output shaft, rotation of the output shaft is transmitted to the first rotating body and the first rotating body rotates in the predetermined direction. The engaging member is provided at a predetermined position on a radial-direction outer side from the rotation center of the first rotating body. When the first rotating body rotates, the engaging member rotates together with the first rotating body. Further, the support shaft and the bearing portion are provided in the first rotating body and the engaging member. With the support shaft being supported by the bearing portion, the engaging member is supported rotatably with respect to the first rotating body.

When the first rotating body rotates in the predetermined direction, the engaging member swings around the shaft center of the support shaft in the direction of engagement while rotating together with the first rotating body. Due to swinging of the engaging member, the engaging member engages with the second rotating body. When the engaging member rotates together with the first rotating body in the predetermined direction in a state in which the engaging member and the second rotating body engage with each other, the engaging member presses the second rotating body and rotates the second rotating body in the predetermined direction. The second rotating body is directly or indirectly connected to the spool, and rotation transmitted from the first rotating body to the second rotating body via the engaging member is further transmitted to the spool, whereby the spool rotates.

In the state in which a webbing belt pulled out from the spool is fastened to the body of a vehicle occupant, when rotating force of the take-up direction is transmitted from the driving member to the spool via the first rotating body, the engaging member, and the second rotating body, the webbing belt is taken up on the spool from its base end side, thereby removing slight looseness, or so-called "slack" of the webbing belt fastened to the body of a vehicle occupant.

In a case in which the engaging member engages with the second rotating body while rotating together with the first rotating body in the predetermined direction as described above, the engaging member receives reaction force from the second rotating body.

In the state in which the engaging member and the second rotating body engage with each other, a clearance is formed between the support shaft and the inner peripheral surface of the bearing portion close to a position at which the engaging member and the second rotating body engages with each other. Therefore, all or a large part of the above-described reaction force is not transmitted to the support shaft portion. For this reason, mechanical strength which resists reaction force transmitted from the second rotating body to the engaging member may not be given to the support shaft.

In the above second aspect, when the engaging member engages with the second rotating body, the clearance may be formed between a portion of the outer peripheral surface of the support shaft that faces a direction of a force applied to the engaging member from the second rotating body and the inner peripheral surface of the bearing portion.

In the above-described aspect, the bearing portion is formed so that an inner peripheral shape thereof is a circular hole whose inner periphery is circular, and the support shaft may have a shape in which a portion of a circular column is scraped off in the axial direction of the support shaft. A side surface of the support shaft close to the position at which the engaging member and the second rotating body engage with each other is scraped off, and a distance between the center of the support shaft and the outer periphery of the scraped support shaft is shorter than a radius of the bearing portion, and a remaining portion of the support shaft may have a radius of curvature substantially equal to the radial dimension of the inner peripheral portion of the bearing portion.

According to the above-described aspect, the bearing portion is formed into a circular hole whose inner periphery is circular.

The support shaft is formed by scraping off a portion of a circular column in a direction along the axial center, and a side of the support shaft away from the position at which the engaging member and the second rotating body engage with each other is not scraped off. The radius of curvature of the outer peripheral surface of the support shaft is substantially equal to the radial dimension of the inner peripheral portion of the bearing portion. The support shaft is supported by the bearing portion so as to be rotatable around the central axis of the bearing portion.

On the contrary, the support shaft is formed by scraping off a portion of a circular column in a direction along the axial center, and a side of the support shaft close to the position at which the engaging member and the second rotating body engage with each other is scraped off. As a result, a clearance is formed between the outer peripheral portion of the support shaft and the inner peripheral portion of the bearing portion, and all or a large part of the above-described reaction force is not transmitted to the support shaft.

In the above-described aspect, the remaining portion of the support shaft that is not scraped off may be set in the range of 180.degree, or more around the shaft center.

According to the above-described embodiment, the curved surface of the outer peripheral portion of the support shaft has a radius of curvature substantially equal to the radius in the inner peripheral portion of the bearing portion and is formed in the range of 180.degree, or more around the shaft center of the support shaft. Accordingly, if the engaging member attempts to be displaced in the radial direction of the bearing portion, the outer peripheral of the support shaft and the inner peripheral portion of the bearing portion interfere with each other. As a result, unnecessary displacement of the engaging member in the radial direction of the bearing portion is restrained.

In the above-described aspect, the first rotating body may include an interference supporting portion that is provided further toward an outer peripheral side in the radial direction of the first rotation member than the engaging member and interferes with the engaging member to which a reaction force is imparted from the second rotating body.

According to the above-described aspect, if the engaging member attempts to be displaced by receiving the reaction force from the second rotating body in the state in which the engaging member and the second rotating member engage with each other, the interference supporting portion provided outside of the engaging member interferes with the engaging member. As a result, displacement of the engaging member is regulated. In this manner, the reaction force which attempts to displace the engaging member is imparted to the interference supporting portion. Therefore, it suffices that the relationship between the support shaft and the bearing portion is determined such that the engaging member is rotatably supported by the support shaft, and mechanical strength which resists the above-described reaction force may not be given to the support shaft.

As described above, the present invention makes it possible to reduce the influence of a force imparted from the second rotating body to the engaging member, and also decrease loss hindering rotation of the engaging member caused by a friction resistance between the outer peripheral portion of the support shaft and the inner peripheral portion of the bearing portion.

BRIEF DESCRIPTION OF THE DRAWINGS

Embodiments of the present invention will be described in detail based on the following figures, wherein.

DETAILED DESCRIPTION OF THE INVENTION

Herebelow, an example of an exemplary embodiment of the present invention will be described in detail with reference to the drawings.

<Structure of an Exemplary Embodiment of the Present Invention>

Figure 1:
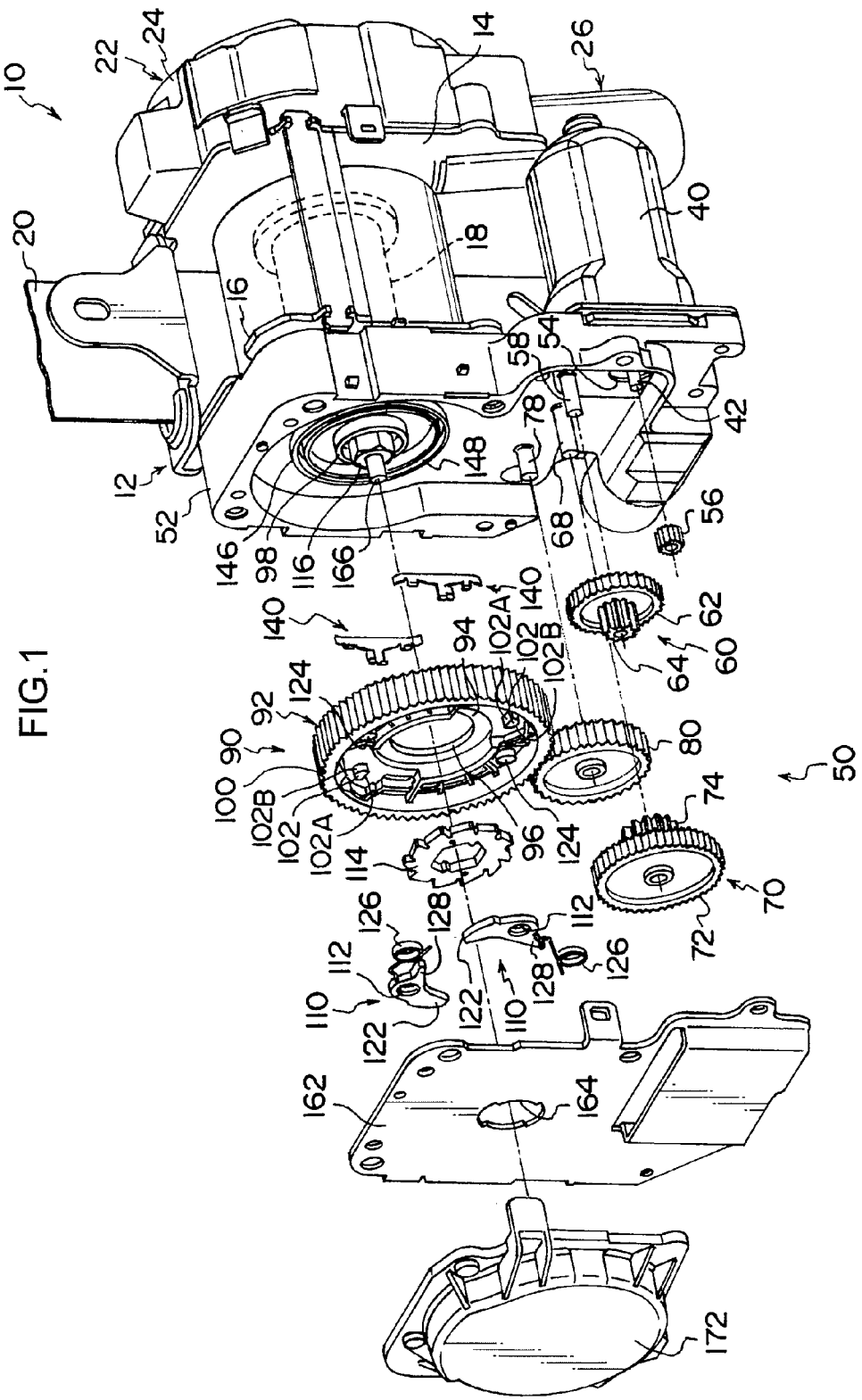
FIG. 1 is an exploded perspective view showing the structure of a principal portion of a webbing take-up device according to an embodiment of the present invention.

FIG. 1 shows an exploded perspective view of the structure of a webbing take-up device 10 according to an exemplary embodiment of the present invention.

The webbing take-up device 10 includes a frame 12 which is fixed to a vehicle constituting member such as a vehicle framework member or a reinforcing member. The frame 12 includes leg plates 14, 16 which face each other substantially in a front-back direction of a vehicle when the frame 12 is mounted to a vehicle body.

A spool 18 is provided between the leg plates 14 and 16. The spool 18 is formed in a substantially cylindrical shape. A longitudinal direction base end portion of a webbing belt 20, which is formed in an elongated band shape, is fixed to the spool 18. When the spool 18 rotates in a take-up direction, the webbing belt 20 is taken up and accommodated from its longitudinal direction base end side. When a vehicle occupant pulls the webbing belt 20 in order to fasten the webbing belt 20 to one's body, the webbing belt 20 wound around the spool 18 is pulled out, and the spool 18 rotates in a pull-out direction which is the reverse direction of the take-up direction.

A torsion shaft (not shown) is provided inside the spool 18. The torsion shaft is formed as a bar-shaped member, the axial direction of the torsion shaft is aligned with the axial direction of the spool 18. A leg plate 16 side of the torsion shaft is connected to the spool 18 and the coaxial rotation of the torsion shaft relative to the spool 18 is not permitted.

A housing 24 of a lock mechanism 22 serving as a lock unit is mounted at a side opposite to the leg plate 16 of the leg plate 14. An end portion of the torsion shaft at a leg plate 14 side is directly or indirectly supported by the housing 24 so as to be rotatable around the central axis of the spool 18. Accommodated inside the housing 24 are various parts which constitute a so-called "VSIR mechanism" which is activated in a case in which a vehicle is in a state of sudden deceleration, so as to regulate rotation of the end portion of the leg plate 14 side of the torsion shaft in a pull-out direction, and various parts which constitute a so-called "WSIR mechanism" which is activated due to the torsion shaft rotating rapidly in the pull-out direction, so as to regulate rotation of the end portion of the leg plate 14 side of the torsion shaft in the pull-out direction.

A pretensioner 26 as a compulsory tension member is provided at the leg plate 14. The pretensioner 26 is operated when the vehicle is in a state of sudden deceleration, and is adapted to apply a rotation force in the take-up direction to the spool 18 or the end portion of the leg plate 14 side of the torsion shaft and to compulsorily rotate the spool 18 in the take-up direction.

A motor 40 serving as a driving member is provided below the spool 18. The motor 40 is electrically connected via an ECU as a control member (not shown) to a battery that is mounted to the vehicle. The motor 40 is also connected to a forward monitoring device such as a radar device that measures a distance with respect to another vehicle traveling in front of the own vehicle or an obstruction in front of the own vehicle. When the ECU determines that the distance to another vehicle traveling in front of the own vehicle or an obstacle in front of the own vehicle is less than a predetermined value on the basis of electrical signals output from the forward monitoring device, the ECU operates the motor 40. The motor 40 is configured that the axial direction of an output shaft 42 is in the same direction as the axial direction of the spool 18, and the leading end of the output shaft 42 protrudes to the opposite direction of the leg plate 14 side of the leg plate 16 via a through hole (not shown) formed at the leg plate 16.

A driving force transmission mechanism 50 is provided at the opposite side of the leg plate 14 side of the leg plate 16. The driving force transmission mechanism 50 includes a gear box 52 as a holding member that is attached to the leg plate 16. The gear box 52 is formed into a concave shape that is opened to. A hole portion 54 is formed at the bottom portion of the gear box 52, and the output shaft 42 of the motor 40 passing through the hole portion of the leg plate 16 gets into the gear box 52 via the hole portion 54.

A gear 56, which is an external tooth gear and a spur gear, is mounted to a leading end side of the output shaft 42 coming into the gear box 52 so as to be coaxial and integral with the output shaft 42. A support shaft 58 is formed laterally from the gear 56 on the bottom portion of the gear box 52. The axial direction of the support shaft 58 is same as the axial direction of the output shaft 42. A two-staged gear 60 is supported rotatably around the support shaft 58. The two-staged gear 60 includes a large-diameter gear 62 which is an external tooth gear and a spur gear. The large-diameter gear 62 has a diameter larger than that of the gear 56 and has more teeth than those of the gear 56. The large-diameter gear 62 meshes with the gear 56. A small-diameter gear 64, which is an external tooth gear and a spur gear and a diameter thereof is smaller than that of the large-diameter gear 62, is formed at a side in the axial direction of the large-diameter gear 62 so as to be coaxial and integral with the large-diameter gear 62.

A support shaft 68 is formed at a side in the radial direction of the two-staged gear 60 on the bottom portion of the gear box 52. The axial direction of the support shaft 68 is same as the axial direction of the output shaft 42 and the support shaft 58. A two-staged gear 70 is supported around the support shaft 68. The two-staged gear 70 includes a large-diameter gear 72 which is an external tooth gear and a spur gear. The large-diameter gear 72 has a diameter larger than that of the small-diameter gear 64 and has more teeth than those of the small-diameter gear 64. The large-diameter gear 72 meshes with the small-diameter gear 64. A small-diameter gear 74, which is an external tooth gear and a spur gear and a diameter thereof is smaller than that of the large-diameter gear 72, is formed at a side in the axial direction of the large-diameter gear 72 so as to be coaxial and integral with the large-diameter gear 72.

A support shaft 78 is formed at a side in the radial direction of the two-staged gear 70 on the bottom portion of the gear box 52. The axial direction of the support shaft 78 is same as the axial direction of the output shaft 42 and the support shafts 58 and 68. A gear 80, which is an external tooth gear and a spur gear, is supported by the support shaft 78 so as to be rotatable about the support shaft 78. The gear 80 has a diameter larger than that of the small diameter gear 74, and has more teeth than those of the small diameter gear 74, where the gear 80 meshes with the small diameter gear 74.

A clutch 90 is provided at a side in a radial direction of the gear 80. The clutch 90 includes an input gear 92 serving as a first rotating body or a support body. The input gear 92 includes a bottom wall portion 94. A circular hole 96 is formed in the bottom wall portion 94. A ring-shaped supporting portion 98 is formed in the gear box 52 so as to correspond to the circular hole 96. From a peripheral of the circular hole 96, a raised portion is formed to the opposite direction of the leg plate 14 side on the bottom portion of the input gear 92. Further, the supporting portion 98 is formed so that the central axis thereof becomes substantially coaxial with the central axis of the spool 18.

The supporting portion 98 passes through the circular hole 96 and supports the input gear 92 rotatably around the central axis of the supporting portion 98. A gear 100, which is an external tooth gear and a spur gear, is formed in the outer peripheral portion of the bottom wall portion 94. The gear portion 100 is formed so as to be coaxial with the circular hole 96, and the input gear 92 has a diameter larger than that of the above-described gear 80 and also has more teeth than those of the gear 80. The gear portion 100 meshes with the gear 80. As described above, the gear 80 is mechanically connected to the gear 56, which is provided at the output shaft 42 of the motor 40, via the two-staged gears 70, 60. Therefore, when the motor 40 is activated and the output shaft 42 rotates by the driving force of the motor 40, rotation of the output shaft 42 is transmitted to the gear portion 100 while the rotation is decelerated, and the input gear 92 rotates.

A pair of support shafts 102 is provided inside the gear portion 100. Each of the support shafts 102 is formed so that its axial direction is same as the axial direction of the circular hole 96, and protrudes from the bottom wall portion 94 of the input gear 92 in the opposite direction of the leg plate 16 side. The support shafts 102 are formed so as to face each other with the axis of the circular hole 96 interposed therebetween. A connection pawl 110 as an engaging member is provided at each of the support shafts 102. A circular hole 112 serving as a bearing portion is formed at each of the connection pawl 110. The support shaft 102 passes through the circular hole 112, and each of the connection pawl 110 is supported by the corresponding circular hole 112 so as to be rotatable about the central axis of the circular hole 112.

A ratchet gear 114 serving as a second rotating body or a rotating body is provided inside the gear portion 100. The ratchet gear 114 is mounted at an adapter 116 that passes through the circular hole 96 of the bottom wall portion 94 and gets into the gear portion 100. The adapter 116 is mounted at the end portion of the torsion shaft in a state incapable of rotating relative to the torsion shaft. The ratchet gear 114 is mounted at the adapter 116 in a state incapable of rotating relative to the adapter 116. The ratchet gear 114 is indirectly connected to the spool 18 via the adapter 116 and the torsion shaft in a state incapable of rotating coaxially relative to the spool 18.

Figure 3:
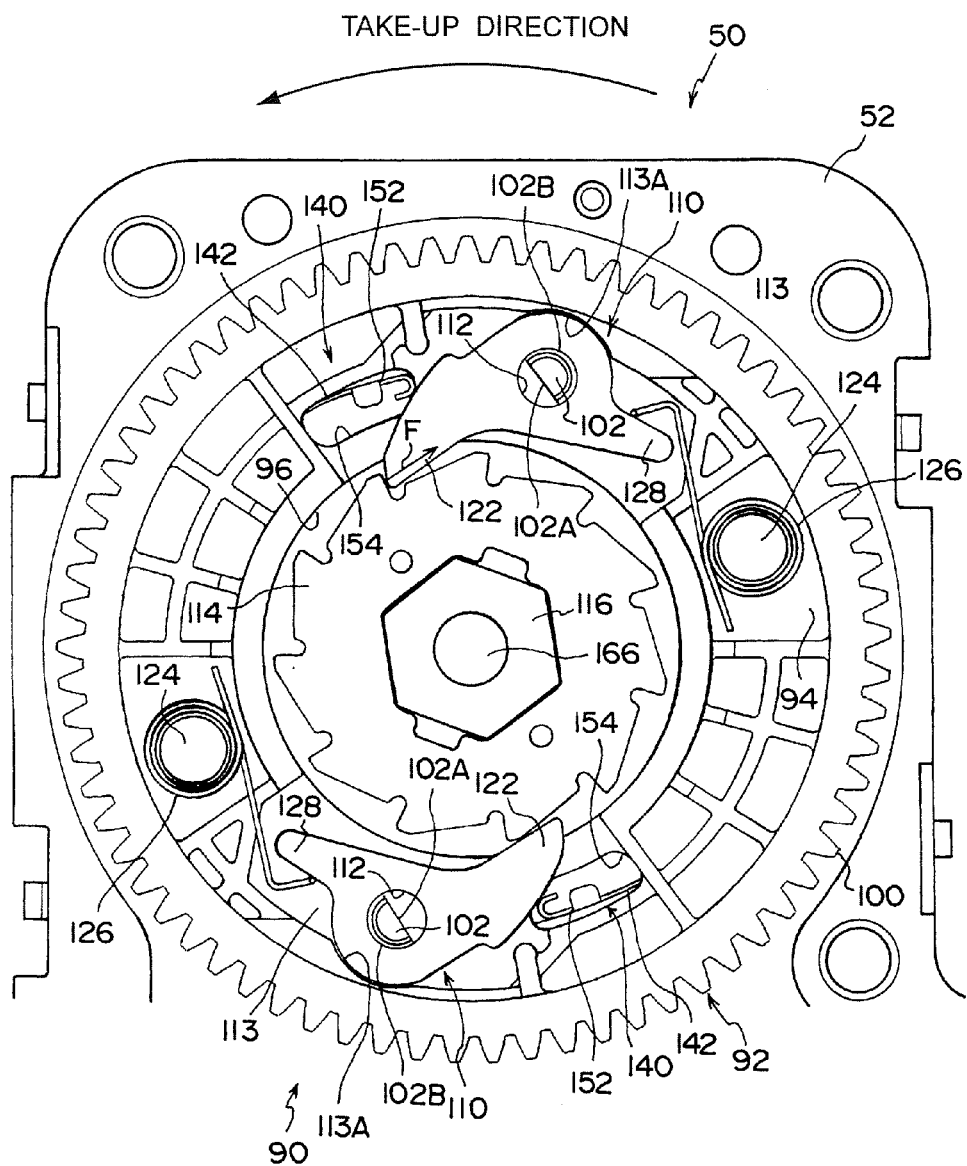
FIG. 3 corresponds to FIG. 2 and indicates a side view showing a state in which an engaging member engages with a second rotating body.

External ratchet teeth are formed on the outer peripheral portion of the ratchet gear 114. A meshing portion 122 is formed at the connection pawl 110 so as to correspond to the ratchet teeth of the ratchet gear 114. When the connection pawl 110 rotates in one direction about the support shaft 102, the meshing portion 122 moves close to the outer peripheral portion of the ratchet gear 114 as shown in FIG. 3, and the meshing portion 122 meshes with the ratchet teeth of the ratchet gear 114. When the meshing portion 122 meshes with the ratchet teeth of the ratchet gear 114 and the input gear 92 rotates in the webbing take-up direction about the support portion 98, the connection pawl 110 rotates in the take-up direction together with the input gear 92, and the meshing portion 122 presses the ratchet gear 114 in the take-up direction, thereby rotating the ratchet gear 114 in the take-up direction together with the input gear 92.

Figure 2:
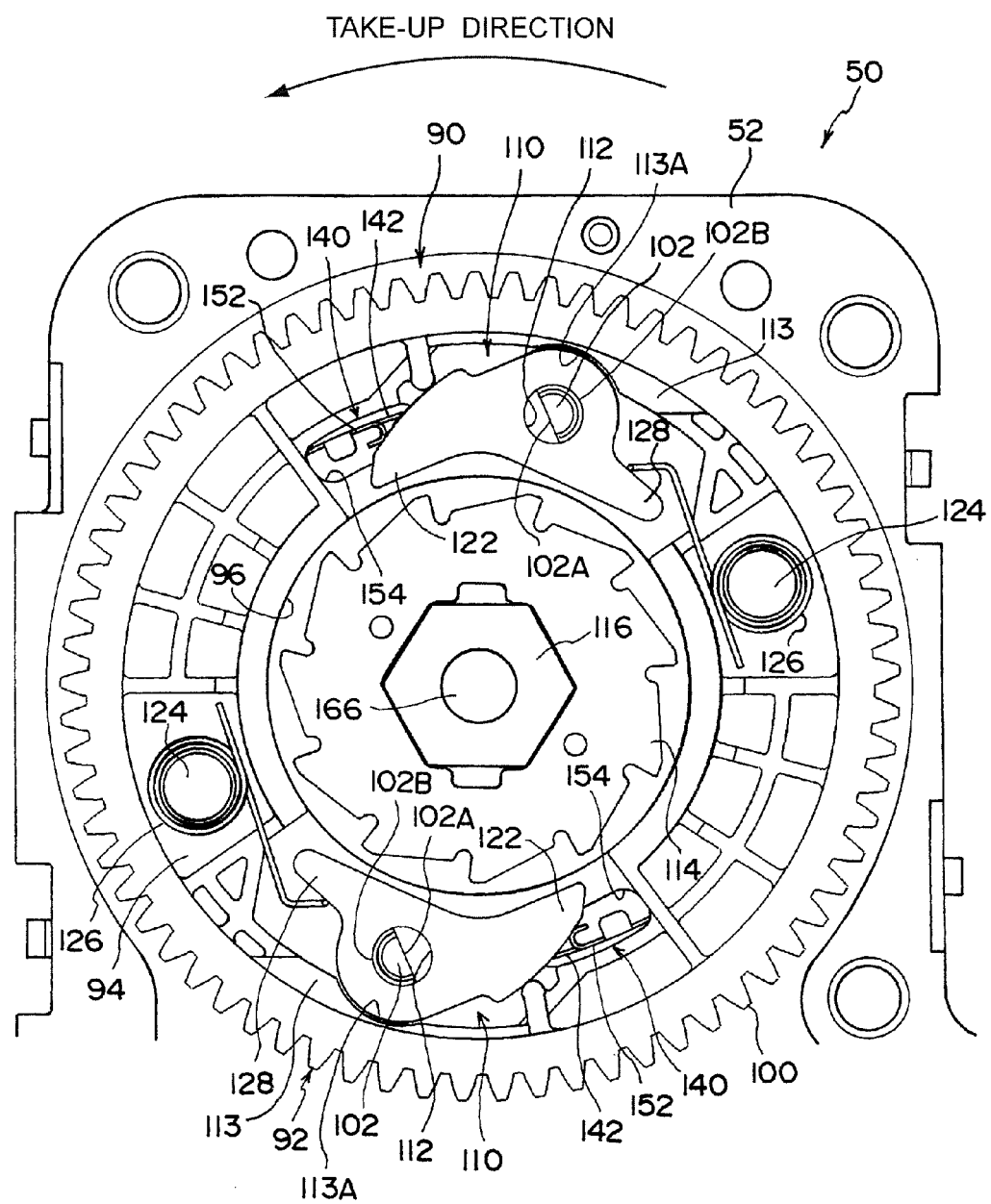
FIG. 2 is an enlarged side view showing the structure of a principal portion of a webbing take-up device according to an embodiment of the present invention.

As shown in FIG. 2 and FIG. 3, in the present exemplary embodiment, the outer peripheral shape of the support shaft 102 is not completely circular. Namely, a part of the outer periphery of the support shaft 102 is formed to have a flat surface portion 102A. The flat surface portion 102A is formed in such a manner that a part of the support shaft 102 which is made circular is scraped off in the axial direction thereof at a position deviated in the radial direction from the center of the circular shape of the support shaft 102. In the state in which the connection pawl 110 and the ratchet gear 114 mesh with each other as shown in FIG. 3, the flat surface portion 102A is formed so as to substantially face from the center of the circular hole 112 toward the position at which the connection pawl 110 and the ratchet gear 114 come into contact with each other (a meshing position).

On the contrary, the outer peripheral surface of the support shaft 102 excluding the flat surface portion 102A is formed as a curved portion 102B. The center of curvature of the curved portion 102B is set at the same position as that on the central axis of the support shaft 102 when the outer peripheral surface of the support shaft 102 is made circular without forming the flat surface portion 102A. Namely, in a state in which the support shaft 102 gets into the circular hole 112, the center of curvature of the curved portion 102B and the center of the circular hole 112 substantially coincide with each other. Further, the curved portion 102B is set in the range of 180° or more around the central axis of the support shaft 102.

Further, as shown in FIG. 2 and FIG. 3, a supporting portion 113 is provided in the input gear 92. The supporting portion 113 is provided at an outer side from the connection pawl 110 along the radial direction of the input gear 92. An interference portion 113A is provided in the supporting portion 113. The interference portion 113A is formed at a position opposite to a direction to which the flat surface portion 102A in the support shaft 120 faces, with respect to the connection pawl 110, and is curved so as to correspond to a region in the vicinity of the circular hole 112. The interference portion 113A and the connection pawl 110 come into contact with each other or are apart from each other at a very short distance. When the connection pawl 110 attempts to be displaced in the direction opposite to the direction in which the flat surface portion 102A faces, namely, in a direction opposite to a position (a meshing position) at which the connection pawl 110 and the ratchet gear 114 comes into contact with each other, the interference portion 113A interferes with the connection pawl 110.

Further, in the present exemplary embodiment, one support shaft 102 is formed to deviate from the other support shaft 102 by 180° about the rotation center of the input gear 92. On the contrary, the number of the external ratchet teeth formed on the ratchet gear 114 is set to be odd. Due to this configuration, when the meshing portion 122 of the connection pawl 110 supported by the one support shaft 102 meshes with a ratchet tooth of the ratchet gear 114, the meshing portion 122 of the connection pawl 110 supported by the other support shaft 102 comes into contact with the intermediate portion of a slope of a ratchet tooth in the rotary circumferential direction of the ratchet gear 114 and does not mesh with the ratchet tooth. With such a configuration, when the ratchet gear 114 rotates by an angle corresponding to a half of an interval of the ratchet teeth, the meshing portion 122 of either one of the connection pawls 110 meshes with the ratchet tooth of the ratchet gear 114.

A supporting pin 124 is formed at the side in a webbing pull-out direction of each of the support shafts 102 along the circumferential direction of the input gear 92 on the bottom wall portion 94. A return spring 126 is attached to each of the supporting pins 124. The return spring 126 is a helical torsion spring whose intermediate portion is coiled, and one end of the return spring is locked at a locking portion (not shown) formed in the bottom wall portion 94. The other end side of the return spring 126 comes into pressure contact with a spring contact portion 128 of the connection pawl 110, and urges the connection pawl 110 in a direction in which the meshing portion 122 is separated from the outer periphery of the ratchet gear 114 around the support shaft 120.

Figure 4:
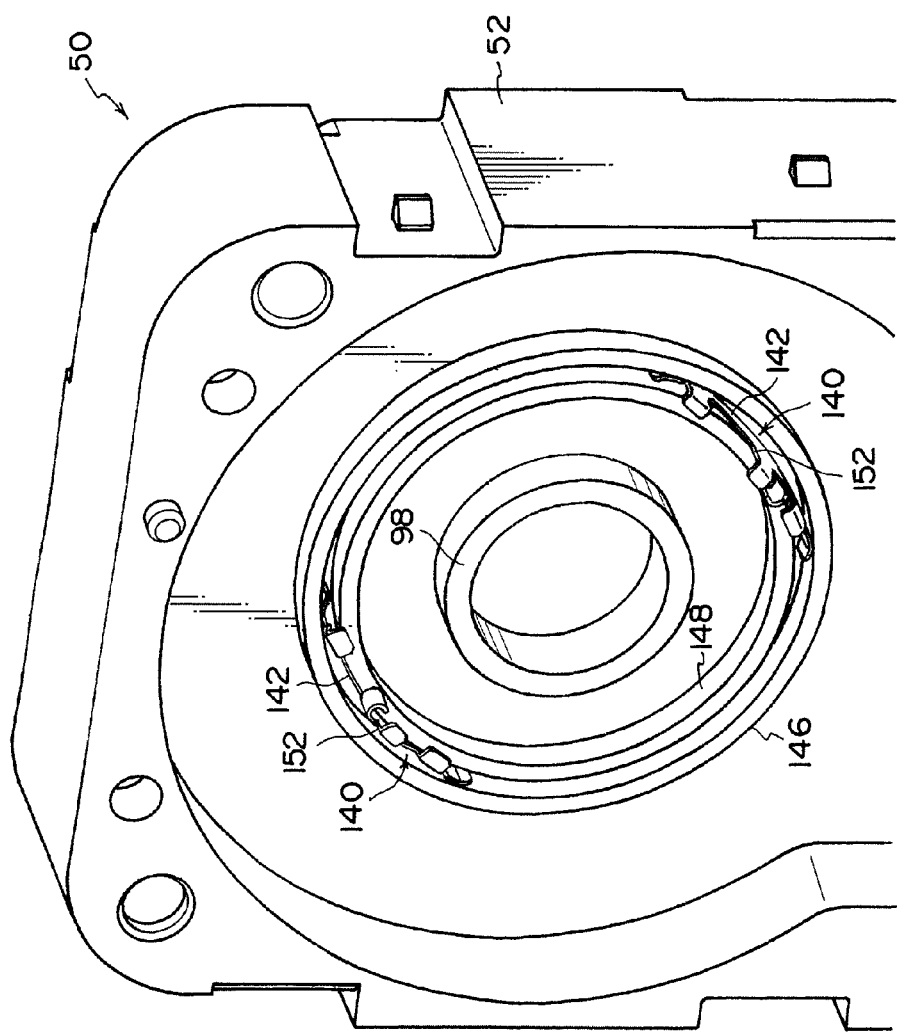
FIG. 4 is a perspective view showing a state in which an interference member is mounted in a gear box.

Further, the clutch 90 includes a pair of interference pieces 140. As shown in FIG. 4, the interference piece 140 includes a base portion 142. The base portion 142 is formed into a narrow plate whose transverse direction coincides with the axial direction of the spool 18. An outer holding ring 146 and an inner holding ring 148 are formed in the bottom portion of the above-described gear box 52 so as to correspond to the base portion 142.

The outer holding ring 146 and inner holding ring 148 are each formed into a ring coaxial with the support portion 98, and are formed upright from the bottom portion of the gear box 52 to the side opposite to a side at which the bridge plate 16 is disposed. The base portion 142 of the interference piece 140 is interposed between the outer holding ring 146 and the inner holding ring 148, and come into pressure contact with the inner peripheral portion of the outer holding ring 146 and the outer peripheral portion of the outer holding ring 148 due to the spring property thereof.

An interference portion 152 extends from one end portion in the widthwise direction and a center part in the longitudinal direction of the base portion 142. That is, the interference portion 152 is disposed at a side opposite to the other side of the base portion 142 facing the bottom portion of the supporting portion 98, when the base portion 142 is interposed between the outer holding ring 146 and the inner holding ring 148). As shown in FIGS. 2 and 3, a through hole 154 is formed in the bottom wall portion 94 of the input gear 92 so as to correspond to the interference portion 152. The through hole 154 is formed in the vicinity of the meshing portion 122 of the connection pawl 110 supported by the support shaft 102. When the interference piece 140 is disposed between the outer holding ring 146 and the inner holding ring 148, the interference portion 152 passes through the through hole 154 and faces the meshing portion 122 in the take-up direction of the meshing portion 122 along the rotary circumferential direction of the input gear 92 when the interference piece 140 is in the initial state.

As shown in FIG. 1, a blocking plate 162 is provided at an end side of an opening of the gear box 52. The blocking plate 162 is attached to the gear box 52 by fastening members such as a bolt or screw (not shown). The blocking plate 162 attached to the gear box 52 blocks the side opposite to the leg plate 16 side of the opening of the gear box 52 and regulates the separation of the two-staged gears 60 and 70, the gear 80, or the input gear 92 (clutch 90). In addition, since the blocking plate 162 blocks not only the opening of the gear box 52 but also the input gear 92 at which the connection pawl 110 and the return spring 126 are accommodated, and the separation of the connection pawl 110 and the return spring 126 from the inside of the input gear 92 is regulated.

A through hole 164 is formed at the blocking plate 162 so as to perforate the blocking plate 162 in the thickness direction. A shaft portion 166 protruding from the adapter 116 passes through the through hole 164 and protrudes to the outside of the blocking plate 162. A spring housing 172 is provided at the outside opposite to the gear box 52 of the blocking plate 162.

The spring housing 172 is integrally connected to the gear box 52. The shaft portion 166 passing through the through hole 164 is inserted into the spring housing 172 and is rotatably supported by a bearing portion (not shown) formed inside the spring housing 172. In addition, a helical spring (not shown) is accommodated in the spring housing 172. The outer end portion of the helical spring in the helical direction is directly or indirectly locked to the spring housing 172, and inner end portion of the helical spring is directly or indirectly locked to the shaft portion 166 inserted into the spring housing 172.

The helical spring is wound and tightened when the shaft portion 166 is rotated in the pull-out direction, and urges the shaft portion 166 in the take-up direction. When the webbing belt 20 pulled out from the spool 18 in a normal state is wound and accommodated in the spool 18, the helical spring rotates the spool 18 in the take-up direction by means of its urging force.

<Operation and Effect of the Present Exemplary Embodiment>

Next, the operation and effect of the present exemplary embodiment are described by way of illustration of the operation of the webbing take-up device 10.

In the webbing take-up device 10, when the ECU determines that the distance with respect to another vehicle traveling in front of the own vehicle or an obstacle in front of the own vehicle is less than a predetermined value on the basis of electrical signals output from the forward monitoring device, the ECU passes electric current to the motor so as to activate the motor 40. When the motor 40 is activated and the output shaft 42 is rotated, the gear 56 transmits rotation of the output shaft 42 to the large-diameter gear 62 of the two-staged gear 60 to thereby rotate the two-staged gear 60. Further, the small-diameter gear 64 of the two-staged gear 60 meshes with the large-diameter gear 72 of the two-staged gear 70, and therefore, rotation of the two-staged gear 60 is transmitted to the two-staged gear 70 so that the two-staged gear 70 rotates. This rotation of the two-staged gear 70 is transmitted to the gear 80 meshing with the small-diameter gear 74, and further, is transmitted to the gear portion 100 meshing with the gear 80 while the initial rotation is decelerated. As a result, the input gear 92 rotates in the webbing take-up direction.

Due to the input gear 92 rotating in the take-up direction, the support shaft 102 formed at the input gear 92 also rotates in the take-up direction, thereby resulting in that the connection pawl 110 supported by the support shaft 102 rotates in the take-up direction. As described above, the interference portion 152 of the interference piece 140 is located at the take-up direction side of the meshing portion 122 of the connection pawl 110 therefore, when the connection pawl 110 rotates in the take-up direction together with the input gear 92, the meshing portion 122 abuts against the interference portion 152 thereby presses the interference portion 152 in the take-up direction.

In the interference piece 140, the base portion 142 is disposed between the outer holding ring 146 and the inner holding ring 148 in a curved state while resisting its elasticity and comes into pressure contact with the outer holding ring 126 and the inner holding ring 148. Due to this configuration, unless the base portion 142 is pressed by a force more than the maximum static frictional force at the contact portion between the base portion 142 and the outer holding ring 146 and the contact portion between the base portion 142 and the inner holding ring 148, the base portion 142 does not move in the circumferential direction of the outer holding ring 146 and the inner holding ring 148 within those holding rings 146 and 148.

Accordingly, when the pressing force of the meshing portion 122 to the interference portion 152 does not surpass the maximum static frictional force at the contact portion between the base portion 142 and the outer holding ring 146 and the contact portion between the base portion 142 and the inner holding ring 148, a pressing reaction force from the interference portion 152 is imparted to the meshing portion 122, and the connection pawl 110 rotates around the support shaft 102 against the urging force of the return spring 126, and the meshing portion 122 moves close to the outer peripheral portion of the ratchet gear 114. Due to rotation of each connection pawl 110, as shown in FIG. 3, when the meshing portion 122 of one connection pawl 110 (the upper side connection pawl in FIG. 3) meshes with the ratchet tooth of the ratchet gear 114, the meshing portion 122 presses the ratchet tooth in the take-up direction.

Further, in this state, since further rotation of the connection pawl 110 is regulated, the meshing portion 122 of the connection pawl 110 keeps pressing the interference portion 152. Accordingly, when the pressing force in the take-up direction applied to the interference portion 152 is more than the maximum static frictional force at the contact portion between the base portion 142 and the outer holding ring 146 and the contact portion between the base portion 142 and the inner holding ring 148, the interference piece 140 is guided by the outer holding ring 146 and the inner holding ring 148 to be rotated in the take-up direction.

Accordingly, the input gear 92 is further rotated in the take-up direction, and the rotation of the input gear 92 is transmitted to the ratchet gear 114 via the connection pawl 110, thereby rotating the ratchet gear 114 in the take-up direction. Since the ratchet gear 114 is connected to the spool 18 via the adapter 116 and the torsion shaft so as not to be rotatable relative to the spool 18, the spool 18 is rotated in the take-up direction when the ratchet gear 114 is rotated in the take-up direction. In this manner, as the spool 18 is rotated in the take-up direction, the webbing belt 20 is wound around the spool 18, thereby removing slight looseness, or so-called "slack" of the webbing belt 20 fastened to an occupant body in the vehicle.

When the meshing portion 122 of the connection pawl 110 meshes with the ratchet teeth of the ratchet gear 114 in the state in which the connection pawl 110 rotates in the take-up direction together with the input gear 92, reaction force F (refer to FIG. 3) from the ratchet teeth of the ratchet gear 114 is imparted to the meshing portion 122, and the connection pawl 110 attempts to be displaced in the direction in which the reaction force F acts.

Note that the outer peripheral portion of the support shaft 102 does not have the shape of perfect circle. The flat surface portion 102A is formed in the support shaft 102, and the curved portion 102B excluding the flat surface portion 102A comes into contact with the inner peripheral portion of the circular hole 112 so as to support the connection pawl 110. Namely, a clearance is formed between the flat surface portion 102A and the inner peripheral portion of the circular hole 112. A direction of a line which connects a contact portion between the meshing portion 122 and the ratchet tooth, and the center of curvature of the curved portion 102B of the support shaft 102 is set along a direction in which the reaction force F acts. The plane of the flat surface portion 102A faces against the acting direction of the reaction force F.

Accordingly, even if the reaction force F acts on the connection pawl 110, the inner peripheral portion of the circular hole 112 does not come into contact with the flat surface portion 102A. Thus, the reaction force F is not applied to the flat surface portion 102A and the support shaft 102. Therefore, such a mechanical strength as to resist the reaction force F is not required in the support shaft 102, and the outer peripheral shape of the support shaft 102 can be made smaller or the support shaft 102 can be made thin.

In this manner, due to the support shaft 102 can be made thin, a contact area where the outer peripheral portion of the support shaft 102 and the inner peripheral portion of the circular hole 112 come into contact with each other can be made smaller. Therefore, when the connection pawl 110 rotates, frictional resistance generated between the outer peripheral portion of the support shaft 102 and the inner peripheral surface of the circular hole 112 becomes smaller and loss hindering rotation of the connection pawl 10 is decreased.

Further, the curved surface 102B of the support shaft 102, which comes into contact with the inner peripheral portion of the circular hole 112 is set in the range of 180° or more around the center of curvature of the support shaft 102. Therefore, if the connection pawl 110 attempts to be displaced in the radial direction of the support shaft 102, a portion of the curved surface 102B in the vicinity of the flat surface portion 102A interferes with the inner peripheral portion of the circular hole 112. As a result, displacement of the connection pawl 110 in a direction orthogonal to the axial direction of the support shaft 102 can be restrained, and the connection pawl 110 can be excellently supported rotatably.

In addition, the interference portion 113A of the supporting portion 113 provided in the input gear 92 is formed at an opposite side of the connection pawl 110 to the flat surface portion 102A of the support shaft 102 faces, in other word, the interference portion 113A is provided at an opposite side of the connection pawl 110 to a position where the connection pawl 110 and the ratchet gear 114 come into contact with each other (mesh with each other). Accordingly, if the connection pawl 110 attempts to be displaced by the reaction force F, the interference portion 113A interferes the connection pawl 110. As a result, displacement of the connection pawl 110 by the above-described reaction force F is regulated, and therefore, the connection pawl 110 is not displaced in a direction orthogonal to the axial direction of the support shaft 102 that is, in the radial direction of the support shaft 102, so that the connection pawl 110 rotates around the center of curvature of the curved portion 102B of the support shaft 102 and the meshing portion 122 can excellently mesh with the ratchet tooth of the ratchet gear 114 at a proper timing.

In the present exemplary embodiment, the structure in which the circular hole 112 serving as a bearing portion is formed in the connection pawl 110 and the support shaft 102 serving as a shaft portion is formed in the input gear 92 is given. However, a structure in which the support shaft 102 is formed in the connection pawl 110 and the circular hole 112 is formed in the input gear 92 may also be employed.

Further, in the present exemplary embodiment, the present invention is applied to the structure in which the clutch 90 is interposed between the motor 40 and the spool 18, but the present invention is not limited to the clutch 90. For example, the present invention may be applied to a structure of supporting an engaging member such as a pawl that engages with a rotating body such as a ratchet gear by swinging in the above-described lock mechanism 22.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An engaging member supporting structure comprising:
   a rotating body being connected to a spool, transmitting rotation to the spool and having rotation from the spool transmitted thereto;
   a support body provided coaxially with the rotating body;
   an engaging member provided at the support body and rotating in one direction and having an end that engages with the rotating body;
   an interference portion provided at the support body proximate to an opposite end of the engaging member;
   a support shaft formed at one of the support body or the engaging member; and
   a bearing portion formed at the other of the support body or the engaging member in such a manner that the support shaft is inserted therein, whereby the engaging member is rotatably provided at the support body,
   wherein, in a state in which the engaging member engages with the rotating body, a clearance is formed between an outer peripheral surface of the support shaft and a portion of an inner peripheral surface of the bearing portion, and
   wherein, when the engaging member engages with the rotating body, the clearance allows the opposite end of the engaging member to move into contact with the interference portion such that a load applied to the engaging member by the rotating body is substantially absorbed by the support body.

2. The engaging member supporting structure of claim 1, wherein, when the engaging member engages with the rotating body, the clearance is formed between a portion of the outer peripheral surface of the support shaft that faces a direction of a force applied to the engaging member from the rotating body and the inner peripheral surface of the bearing portion.

3. The webbing take-up device according to claim 1, wherein the clearance extends throughout a thickness of the inner peripheral surface of the bearing portion.

4. A webbing take-up device comprising:
   a spool to which one end in a longitudinal direction of an elongated band-shaped webbing belt is locked, and which rotates in a take-up direction thereby taking up the webbing belt and accommodating the webbing belt on the spool;
   a driving member causing an output shaft thereof to rotate;
   a first rotating body connected to the output shaft and rotating by rotation of the output shaft being transmitted thereto;
   a second rotating body connected to the spool and rotating by rotation of the first rotating body being transmitted thereto, the second rotating body transmitting rotation of the first rotating body to the spool such that the spool rotates;
   an engaging member supported at a supporting position apart from a rotation center outwardly in a radial direction of the first rotating body, and rotating around the rotation center of the first rotating body together with the first rotating body, the engaging member swinging around the supporting position in a predetermined direction and having an end that engages with the second rotating body and transmitting rotation of the first rotating body in another predetermined direction to the second rotating body so as to rotate the second rotating body;
   an interference portion provided at the support body proximate to an opposite end of the engaging member;
   a support shaft formed at one of the first rotating body or the engaging member; and
   a bearing portion formed in the other one of the first rotating body or the engaging member in such a manner that the support shaft is insertable therein,
   wherein when the support shaft is inserted in the bearing portion, the engaging member is supported rotatably at the supporting position of the first rotating body, and
   in a state in which the engaging member engages with the second rotating body, a clearance is formed between the support shaft and an inner peripheral surface of the bearing portion close to a position at which the engaging member and the second rotating member engage with each other, and
   wherein, when the engaging member engages with the rotating body, the clearance allows the opposite end of the engaging member to move into contact with the interference portion such that a load applied to the engaging member by the rotating body is substantially absorbed by the support body.

5. The webbing take-up device according to claim 4, wherein, when the engaging member engages with the second rotating body, the clearance is formed between a portion of the outer peripheral surface of the support shaft that faces a direction of a force applied to the engaging member from the second rotating body and the inner peripheral surface of the bearing portion.

6. The webbing take-up device according to claim 4, wherein the bearing portion is formed so that an inner peripheral shape thereof is a circular hole, the support shaft has a shape in which a portion of a circular column is scraped off in the axial direction of the support shaft, a side surface of the support shaft close to the position at which the engaging member and the second rotating body engage with each other is scraped off, and a distance between the center of the support shaft and an outer periphery of the scraped shaft portion is shorter than a radius of the bearing portion, and a remaining portion of the support shaft has a radius of curvature substantially equal to a radius of the inner peripheral portion of the bearing portion.

7. The webbing take-up device according to claim 6, wherein one remaining portion of the support shaft that is not scraped off is set in the range of 180° or more around the shaft center.

8. The webbing take-up device according to claim 4, wherein the first rotating body includes an interference supporting portion that is provided further toward an outer peripheral side than the engaging member and interferes with the engaging member to which a reaction force is imparted from the second rotating body.

9. The webbing take-up device according to claim 4, wherein the clearance extends throughout a thickness of the inner peripheral surface of the bearing portion.

* * * * *